(12) United States Patent
Miyake

(10) Patent No.: US 11,711,014 B2
(45) Date of Patent: Jul. 25, 2023

(54) ELECTRIC-POWER CONVERSION APPARATUS

(71) Applicant: Mitsubishi Electric Corporation, Tokyo (JP)

(72) Inventor: Toru Miyake, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/564,324

(22) Filed: Dec. 29, 2021

(65) Prior Publication Data

US 2022/0368216 A1 Nov. 17, 2022

(30) Foreign Application Priority Data

May 17, 2021 (JP) ................................. 2021-082890

(51) Int. Cl.
*H02M 1/32* (2007.01)
*H02M 7/00* (2006.01)
(Continued)

(52) U.S. Cl.
CPC ............ *H02M 1/327* (2021.05); *H02M 7/003* (2013.01); *H02M 7/5387* (2013.01); *H02P 27/08* (2013.01); *H02P 29/68* (2016.02)

(58) Field of Classification Search
CPC .......... H02P 27/00; H02P 27/04; H02P 27/06; H02P 27/08; H02P 29/00; H02P 29/02; H02P 29/032; H02P 29/60; H02P 29/62; H02P 29/64; H02P 29/68; H02P 29/66; H02P 2201/03; H02P 2201/07; H02P 2201/09; H02P 2201/11; H02P 2207/05;
(Continued)

(56) References Cited

U.S. PATENT DOCUMENTS

2019/0178728 A1* 6/2019 Kawaguchi ........... H02M 7/537

FOREIGN PATENT DOCUMENTS

JP 2008-220042 A 9/2008
JP 2015-027127 A 2/2015

OTHER PUBLICATIONS

Office Action dated Apr. 5, 2022 in Japanese Application No. 2021-082890.

* cited by examiner

*Primary Examiner* — Antony M Paul
(74) *Attorney, Agent, or Firm* — Sughrue Mion, PLLC; Richard C. Turner

(57) ABSTRACT

There is obtained an electric-power conversion apparatus that prevents it that the temperature of a semiconductor switching device reaches a breakage temperature and hence the semiconductor switching device is broken and that realizes continuity of driving. The electric-power conversion apparatus includes
a temperature sensor that detects a temperature of semiconductor switching device, and
a temperature rising rate determination unit that compares a predetermined first threshold value with a temperature rising rate calculated based on a temperature detection value detected by the temperature sensor and determines that the temperature rising rate has exceeded the first threshold value; when the temperature rising rate determination unit determines that the temperature rising rate has exceeded the first threshold value, protective operation for suppressing an output of an electric-power conversion unit is performed.

20 Claims, 8 Drawing Sheets

(51) Int. Cl.
*H02P 29/68* (2016.01)
*H02P 27/08* (2006.01)
*H02M 7/5387* (2007.01)

(58) Field of Classification Search
CPC .......... H02P 21/00; H02P 21/14; H02P 21/22;
H02P 23/00; H02P 23/14; H02P 25/062;
H02P 25/064; H02P 25/03; H02P 7/292;
H02P 7/00; H02P 7/29; H02P 6/00; H02P
6/04; H02P 6/06; H02P 6/08; H02P 6/12;
H02P 1/00; H02P 1/26; H02P 1/42; H02P
1/46; H02P 1/423; H02H 7/08
See application file for complete search history.

ELECTRIC-POWER CONVERSION APPARATUS

BACKGROUND OF THE INVENTION

Field of the Invention

The present disclosure relates to an electric-power conversion apparatus.

Description of the Related Art

In general, as electric-power conversion apparatuses for converting output forms of electric power, there exist an AC/DC converter (Alternate Current/Direct Current Converter) that converts AC electric power into DC electric power, an inverter that converts DC electric power into AC electric power, a DC/DC converter that changes the respective levels of an input voltage and an input current, and the like. In many cases, each of these electric-power conversion apparatuses has a semiconductor switching device.

Semiconductor switching devices include a diode for making a current flow only in one direction, a thyristor that is suitable for dealing with a large current, a power transistor as a power semiconductor switching device that can work at a high switching frequency. In particular, a power transistor among the semiconductor switching devices is utilized in each of a wide variety of fields such as the automobile field, the refrigerator field, and the air conditioner field. Power transistors include an IGBT (Insulated Gate Bipolar Transistor) and a MOS-FET (Metal-Oxide-Semiconductor Field-Effect Transistor); these power transistors are each utilized separately for the respective applications.

In recent years, as the material for a semiconductor switching device, SiC (Silicon Carbide) and GaN (Gallium Nitride) have been drawing attention. The on-state resistance value of the semiconductor switching device formed of any one of these materials is smaller than that of the semiconductor switching device utilizing conventional Si (Silicon); thus, the electric-power loss therein can be reduced. Moreover, the electron saturation speed thereof is high and switching between on and off states is rapid; thus, the electric-power loss therein can be reduced.

In comparison with a semiconductor switching device, a semiconductor switching device utilizing Silicon Carbide or Gallium Nitride can be driven under a high-temperature environment. However, the operation limit temperature of a semiconductor switching device is specified; in the case driving of the semiconductor switching device continues even when the operation limit temperature is surpassed, the semiconductor switching device may be broken.

For example, in the case where a semiconductor switching device is driven in such a way that the electric-power loss increases, i.e., the electric-power conversion apparatus outputs large electric power, or in the case where the semiconductor switching device is driven at a higher switching frequency, the temperature of the semiconductor switching device rises.

In addition, the temperature of a semiconductor switching device depends also on an environment where the electric-power conversion apparatus is disposed. An electric-power conversion apparatus has a cooling device for cooling a heat-generating body such as a semiconductor switching device; however, the temperature of the cooling medium of the cooling device becomes high, depending on the environment where the electric-power conversion apparatus is disposed. Accordingly, the temperature of the semiconductor switching device further rises. In particular, when for example, due to a failure in a device for making the cooling medium flow into the cooling device, the cooling medium is stopped from flowing into the cooling device, heat cannot be radiated from the cooling device; thus, the temperatures of the semiconductor switching device and the like may continue drastic rising.

In this case, the respective temperatures of the semiconductor switching device and the cooling medium can be lowered by stopping the electric-power conversion apparatus. However, because for example, an electric-power conversion apparatus utilized in the electric power steering apparatus mounted in an automobile controls a motor for assisting the steering of the automobile, the electric-power conversion apparatus cannot be stopped during driving of the automobile; therefore, it is required that even when the temperature of the semiconductor switching device is high, the electric-power conversion apparatus is made to continue driving, without breaking the semiconductor switching device.

As described above, depending on the driving condition, the arrangement environment, or the like of the electric-power conversion apparatus, the temperature of the semiconductor switching device may rise to the temperature (hereinafter, referred to as an operation limit temperature) at which the semiconductor switching device is broken. Accordingly, in order to make the electric-power conversion apparatus continue driving, while preventing the temperature of the semiconductor switching device from reaching the operation limit temperature, it is required to make the electric-power conversion apparatus perform driving with an appropriate driving condition and in an appropriate arrangement environment. In particular, it is required that in the disposition environment for the semiconductor switching devices included in the electric-power conversion apparatus, there is quickly recognized an abnormal state where the inflow of a cooling medium that flows in the cooling device stops or where the cooling medium is lost and that control is performed with a changed driving condition of the electric-power conversion apparatus so that the temperature of the semiconductor switching device is prevented from reaching the breakage temperature.

To date, with regard to the arrangement environment for the semiconductor switching devices, there has been proposed a technology in which in the case where the inflow of a cooling medium that flows in the cooling device stops and hence the temperatures of the semiconductor switching device and the like continue drastic rising at a specific temperature rising rate and in the case where the temperature of the semiconductor switching device may reach the operation limit temperature, the temperature of the cooling medium flowing in the cooling device is monitored and when the temperature is abnormal, the driving condition of the electric-power conversion apparatus is controlled so as to protect the semiconductor switching device (for example, refer to Patent Document 1).

PRIOR ART REFERENCE

Patent Document

[Patent Document 1] Japanese Patent Application Laid-Open No. 2008-220042

SUMMARY OF THE INVENTION

As described above, there exists a probability that the temperature of a semiconductor switching device reaches the operation limit temperature, due to the driving condition and the arrangement environment of the electric-power conversion operation; however, the conventional technology disclosed in Patent Document 1 monitors an abnormality in the arrangement environment by providing a temperature sensor for measuring the temperature of a cooling medium, in addition to a temperature sensor for measuring the temperature of a semiconductor switching device. In this regard, however, it is required to separately provide a temperature sensor for monitoring the temperature of a cooling medium. Moreover, it is required that a control IC and a CPU for monitoring the cooling medium are added or additionally installed and that a wiring space and the like for connecting the temperature sensor for monitoring the temperature of the cooling medium with the control IC and the CPU.

Therefore, because the conventional technology disclosed in Patent Document 1 requires that a temperature sensor for measuring the temperature of a cooling medium and hardware items for monitoring an abnormality in the cooling medium are added or additionally installed, there exists a problem that the cost rises.

In addition, there exists a technology in which a temperature detection value of a temperature sensor for detecting the temperature of a semiconductor switching device is monitored and then the driving condition of an electric-power conversion apparatus is operated so that the temperature of a semiconductor chip included in the semiconductor switching device does not reach the operation limit temperature. In this technology, in the case where the temperature detection value exceeds a predetermined threshold value, the driving condition of the electric-power conversion operation is operated so that it changes, so that temperature rise in the semiconductor switching device is suppressed.

Meanwhile, in consideration of a detection error in the temperature sensor, variations in the amounts of generated heat in the semiconductor switching devices, variations in the inflow amounts of the cooling medium, and the like, the foregoing threshold value is set higher so that no abnormality is erroneously detected when the driving condition and the arrangement environment are normal. Accordingly, in the case where when no foregoing variations exist, the driving condition or the arrangement environment of the electric-power conversion apparatus becomes abnormal, it takes a long time that the temperature detection value reaches the threshold value that has been set higher. That is to say, the time from the occurrence of an abnormality to the detection thereof becomes longer.

In particular, in the case of a failure where the inflow of the cooling medium stops or the cooling medium is lost, the temperature of the semiconductor switching device continues drastic rising; therefore, in proportion to the time from the occurrence of an abnormality to the detection thereof, the reaching temperature of the semiconductor switching device becomes higher. Because even in this case, it is required to prevent the breakage of the semiconductor switching device, there is required an expensive semiconductor switching device such as a semiconductor switching device having a higher heat resistance or a low-loss semiconductor switching device.

As described above, the technology in which the temperature detection value of the temperature sensor is compared with a predetermined threshold value so that an abnormality in the driving condition or the arrangement environment of the electric-power conversion apparatus is detected has a problem that at a time of a failure where the inflow of the cooling medium stops or the cooling medium is lost, the reaching temperature of the semiconductor switching device becomes high.

The present disclosure is to disclose a technology for solving the foregoing problems; the objective thereof is to provide an electric-power conversion apparatus that prevents it that the temperature of a semiconductor switching device reaches an operation limit temperature and hence the semiconductor switching device is broken and that realizes continuity of driving.

An electric-power conversion apparatus disclosed in the present disclosure includes an electric-power conversion unit as an electric-power converter including semiconductor switching devices, a cooling device for cooling the semiconductor switching devices, and a control apparatus for controlling switching of the semiconductor switching devices. The electric-power conversion apparatus is characterized by including a temperature sensor that detects a temperature of the semiconductor switching device and a temperature rising rate determination unit as a temperature rising rate determiner that compares a predetermined first threshold value with a temperature rising rate calculated based on a temperature detection value detected by the temperature sensor, and in that when the temperature rising rate determination unit determines that the temperature rising rate has exceeded the first threshold value, protective operation for suppressing an output of the electric-power conversion unit is performed.

The present disclosure makes it possible to obtain an electric-power conversion apparatus that prevents it that the temperature of a semiconductor switching device reaches an operation limit temperature and hence the semiconductor switching device is broken and that realizes continuity of driving.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Figure 1:
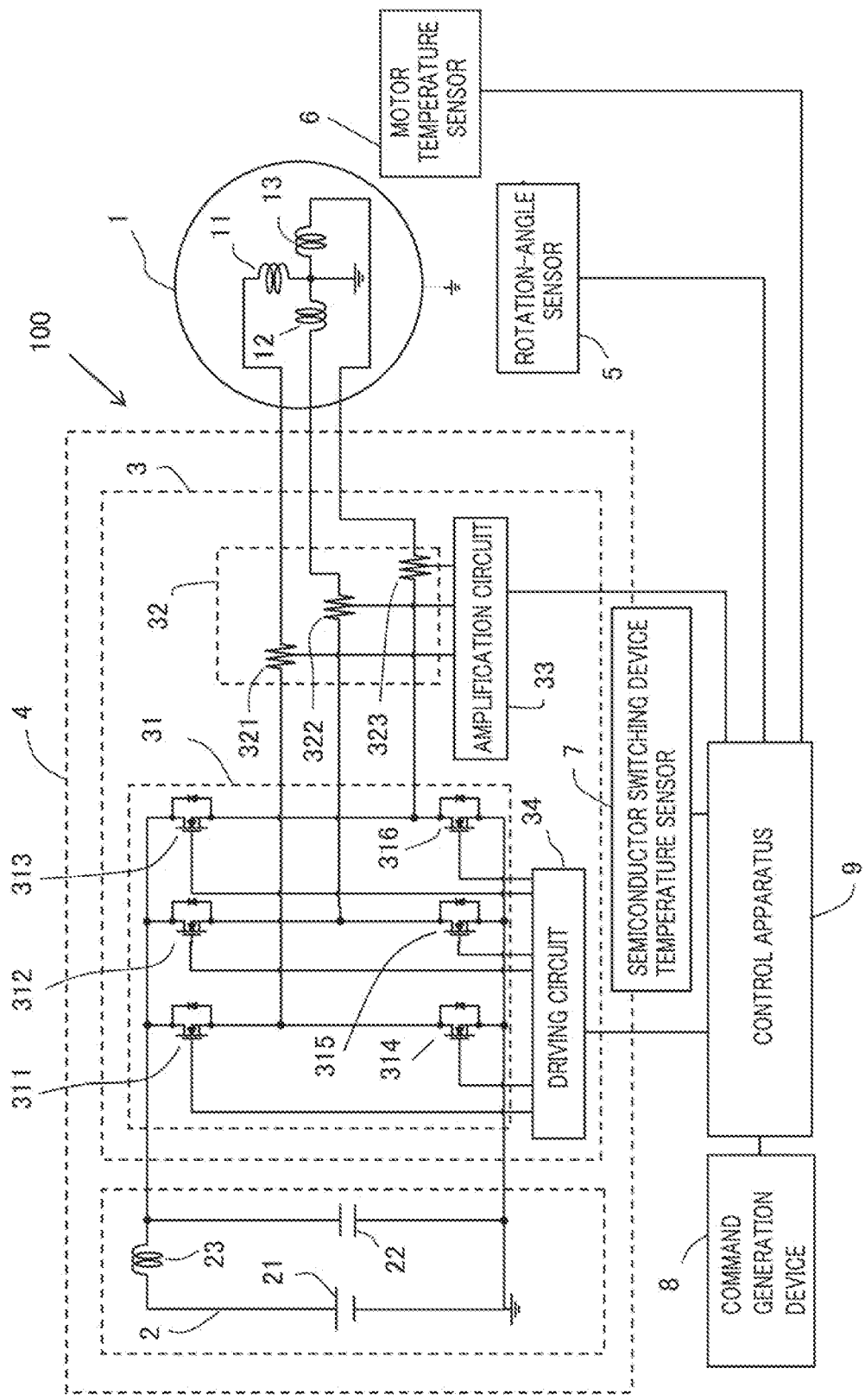
FIG. 1 is a configuration diagram representing an electric-power conversion apparatus according to Embodiment 1.

Hereinafter, respective electric-power conversion apparatuses according to Embodiments 1 through 3 will be explained. In each of the drawings, the same or similar portions are designated by the same reference characters. In each of the embodiments, there is represented an electric-power conversion apparatus applied to a three-phase inverter that has U, V, and W phases and is made to drive an AC motor.

Embodiment 1

FIG. 1 is a configuration diagram representing an electric-power conversion apparatus according to Embodiment 1. In FIG. 1, an electric-power conversion apparatus 100 has a power source unit 2, an electric-power conversion unit 3 as an electric-power converter, a cooling device 4, a rotation-angle sensor 5, a motor temperature sensor 6, a semiconductor switching device temperature sensor 7, a command generation device 8, and a control apparatus 9. The motor 1 is a load apparatus of the electric-power conversion apparatus 100; however, the load apparatus is not limited to the motor 1 and may be an apparatus other than a motor.

The motor 1 is controlled through a PWM (Pulse Width Modulation) method. The motor 1 is, for example, a vehicle motor. In the present embodiment, specifically, the vehicle motor is a motor to be utilized as a driving motor for driving a vehicle, an electric fan, an oil pump, a water pump, an electric power steering apparatus for assisting steering operation for a vehicle, or the like. In addition, the motor 1 is not limited to a vehicle motor and may be a motor utilized in a non-automobile use.

Hereinafter, the explanation will be made under the assumption that the motor 1 is a three-phase brushless motor having a rotor and a stator. The rotor (unillustrated) is a discoidal member and has magnetic-field poles formed of permanent magnets fixed to the surface thereof. The stator contains the rotor in a relatively pivotable manner. The stator has two or more protruding portions that radially protrude every angle, which is preliminarily set in the radial direction; a U-phase coil 11, a V-phase coil 12, and a W-phase coil 13 are wound at the respective protruding portions.

The power source unit 2 is a driving power source for the motor 1 and outputs DC electric power to the electric-power conversion unit 3. As a specific configuration example of the power source unit 2, the power source unit 2 has a battery 21, which is an example of a DC electric power that outputs DC electric power, a smoothing capacitor 22, and a choke coil 23.

The smoothing capacitor 22 and the choke coil 23 are arranged between the battery 21 and an after-mentioned inverter unit 31 and are included in a power filter. By configuring the power filter in such a way as described above, there can be reduced not only noise that is transmitted from other apparatuses sharing the battery 21 with the inverter unit 31 to the inverter unit 31 but also noise that is transmitted from the inverter unit 31 to the other apparatuses sharing the battery 21 with the inverter unit 31. The smoothing capacitor 22 accumulates electric charges so as to supplement power supply to semiconductor switching devices 311, 312, 313, 314, 315, and 316 and further to suppress noise components such as a surge current and the like. The respective voltages of the battery 21 and the smoothing capacitor 22 are obtained by the control apparatus 9.

The electric-power conversion unit 3 converts DC electric power supplied from the power source unit 2 into AC electric power and then outputs the converted AC electric power to the motor 1. As a specific configuration example of the electric-power conversion unit 3, the electric-power conversion unit 3 has the inverter unit 31, a current detection device 32, an amplification circuit 33, and a driving circuit 34.

In the inverter unit 31, two or more half-bridge circuits each of which has semiconductor switching devices in the upper arm and the lower arm thereof are connected in parallel with one another; the semiconductor switching devices 311, 312, 313, 314, 315, and 316 are controlled through on/off-switching in accordance with PWM signals; DC electric power outputted from the power source unit 2 is converted into AC electric power; then, the converted AC electric power is outputted to the motor 1.

FIG. 1 represents an example in which the inverter unit 31 includes three half-bridge circuits. The inverter unit 31 is a three-phase inverter including the semiconductor switching devices 311, 312, 313, 314, 315, and 316; in order to switch respective energizations of the U-phase coil 11, the V-phase coil 12, and the W-phase coil 13, the six semiconductor switching devices 311, 312, 313, 314, 315, and 316 are in bridge connection. As each of the semiconductor switching devices 311, 312, 313, 314, 315, and 316, a MOSFET, which is a kind of field-effect transistor, may be utilized; alternatively, a transistor other than a MOSFET or an IGBT may be utilized.

The respective drains of the three semiconductor switching devices 311, 312, and 313 are connected with the positive-polarity side of the battery 21. The sources of the semiconductor switching devices 311, 312, and 313 are connected with the drains of the semiconductor switching devices 314, 315, and 316, respectively. The respective drains of the other three semiconductor switching devices 314, 315, and 316 are connected with the negative-polarity side of the battery 21.

The connection point where a pair of the semiconductor switching devices 311 and 314 are connected with each other is connected with one end of the U-phase coil 11 of the motor 1. Moreover, the connection point where a pair of the semiconductor switching devices 312 and 315 are connected with each other is connected with one end of the V-phase coil 12 of the motor 1. Furthermore, the connection point where a pair of the semiconductor switching devices 313 and 316 are connected with each other is connected with one end of the W-phase coil 13 of the motor 1.

The three semiconductor switching devices 311, 312, and 313 arranged at the higher-potential side of the inverter unit 31 form the semiconductor switching devices of the U-phase upper arm, the V-phase upper arm, and the W-phase upper arm, respectively; the three semiconductor switching devices 314, 315, and 316 arranged at the lower-potential side of the inverter unit 31 form the semiconductor switching devices of the U-phase lower arm, the V-phase lower arm, and the W-phase lower arm, respectively. In addition, in Embodiment 1, for the sake of clear understanding of the explanation, the electric potential of the lower-potential side is set to 0 [V].

The current detection device 32 includes a U-phase current detection unit 321, a V-phase current detection unit 322, and a W-phase current detection unit 323. Each of the U-phase current detection unit 321, the V-phase current detection unit 322, and the W-phase current detection unit 323 is formed by use of, for example, a shunt resistor. The U-phase current detection unit 321 outputs a U-phase current detection value corresponding to a U-phase current Iu flowing in the U-phase coil 11. The V-phase current detection unit 322 outputs a V-phase current detection value corresponding to a V-phase current Iv flowing in the V-phase coil 12. The W-phase current detection unit 323 outputs a W-phase current detection value corresponding to a W-phase current Iw flowing in the W-phase coil 13. In addition, in the following explanation, the U-phase current detection value, the V-phase current detection value, and the W-phase current detection value may collectively be referred to as current detection values.

In addition, although not represented, it may be allowed that in place of or along with the current detection device 32, there is provided a voltage detection device for detecting a voltage applied to each of the semiconductor switching devices 311, 312, 313, 314, 315, and 316. In this case, the output state of the electric-power conversion unit 3 is calculated based on at least one of a detection value of the current detection device 32, a detection value of the voltage detection device, and a command value for commanding the electric-power conversion apparatus to output.

The U-phase current detection value, the V-phase current detection value, and the W-phase current detection value outputted from the U-phase current detection unit 321, the V-phase current detection unit 322, and the W-phase current detection unit 323, respectively, are inputted to the control apparatus 9 by way of the amplification circuit 33. The amplification circuit 33 makes the U-phase current detection value, the V-phase current detection value, and the W-phase current detection value become respective appropriate values that can be processed in the control apparatus 9.

The driving circuit 34 has a function of switching respective on/off states of the semiconductor switching devices 311, 312, 313, 314, 315, and 316, based on PWM signals to be inputted thereto from the control apparatus 9.

The cooling device 4 cools the smoothing capacitor 22, the choke coil 23, and the electric-power conversion unit 3. The cooling device 4 is, for example, a water-cooled cooling device. Specifically, the cooling device 4 is configured in such a way that a hose connects a water-cooled cooling device with a motor such as a water pump, and makes a cooling medium such as water, oil, or LLC (Long Life Coolant) enter the water-cooled cooling device from the motor 1. In addition, the cooling device 4 is not limited to a water-cooled cooling device and may be an air-cooled cooling device or the like.

The rotation-angle sensor 5 is mounted on the motor 1 and detects positional information indicating a rotor position of the motor 1; specifically, the rotation-angle sensor 5 detects a rotation angle θm of the rotor. The rotation-angle sensor 5 is formed by use of, for example, a resolver. The rotation-angle sensor 5 is configured in such a way as to convert the detected rotation angle θm into an electric angle θe, based on the number of the pole-pairs of the permanent magnets in the motor 1. The rotation angle θm and the electric angle θe are inputted to the control apparatus 9.

The motor temperature sensor 6 detects the temperature of the motor 1. The motor temperature sensor 6 includes temperature sensors such as thermistor and the like mounted on, for example, the U-phase coil 11, the V-phase coil 12, and the W-phase coil 13. The temperature of the motor 1 is inputted to the control apparatus 9.

The semiconductor switching device temperature sensor 7 detects respective temperatures of the semiconductor switching devices 311, 312, 313, 314, 315, and 316. Specifically, for example, the respective semiconductor switching device temperature sensors 7 are provided adjacent to the semiconductor switching devices 311, 312, 313, 314, 315, and 316 and indirectly measure respective temperatures Tj of the semiconductor switching devices 311, 312, 313, 314, 315, and 316. In addition, the semiconductor switching device temperature sensors 7 may directly detect the respective temperatures Tj of the semiconductor switching devices 311, 312, 313, 314, 315, and 316.

In the case where respective temperature detection values Tj_sens outputted by the semiconductor switching device temperature sensors 7 are based on the temperatures in the vicinities of the semiconductor switching devices 311, 312, 313, 314, 315, and 316, the respective temperature detection values Tj_sens correspond to the temperatures of the semiconductor switching devices 311, 312, 313, 314, 315, and 316, because the respective temperatures in the vicinities of the semiconductor switching devices 311, 312, 313, 314, 315, and 316 correspond to the temperatures Tj of the semiconductor switching devices 311, 312, 313, 314, 315, and 316. The respective temperature detection values Tj_sens are inputted to the control apparatus 9.

The command generation device 8 is an apparatus that generates a control command for controlling the motor 1 and then outputs the control command to the control apparatus 9. Specifically, for example, in the case where the motor 1 is utilized as a driving source for a vehicle such as an electric automobile, the command generation device 8 outputs the control command after converting it into a control command corresponding to an accelerator-pedal treading angle to be operated by a driver of the vehicle. The control command generated by the command generation device 8 is periodically transmitted to the control apparatus 9 by means of communication.

In addition, the control commands for controlling the motor 1 include, for example, a torque command, a current command, a voltage command, and the like. In Embodiment 1, the case where as the control command, a torque command Trq* is adopted is represented.

The control apparatus 9 performs control of the overall motor driving system; for example, the control is realized by a MICON or the like configured in such a way as to execute a program stored in a memory.

Figure 2:
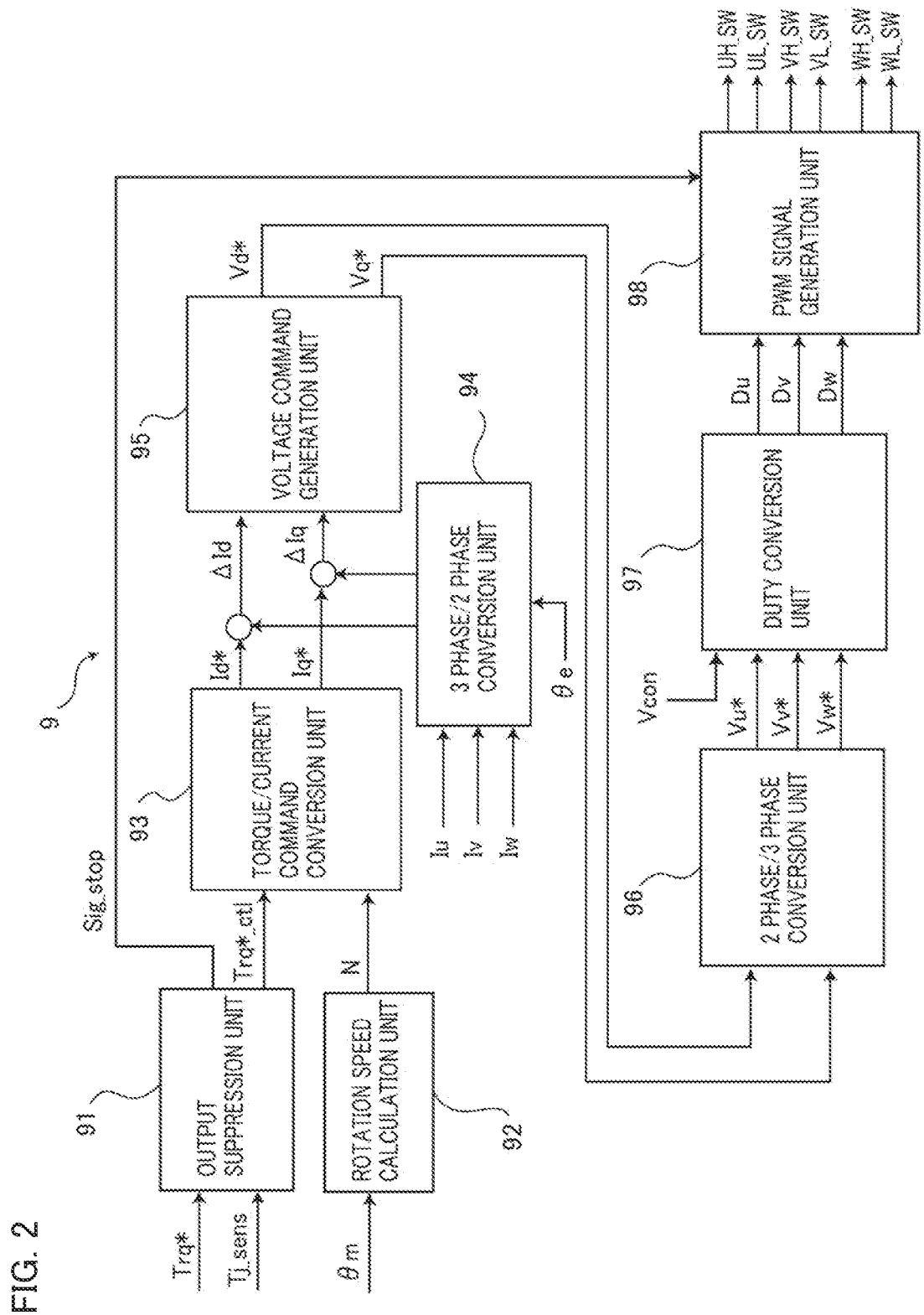
FIG. 2 is a block diagram representing the configuration of a control apparatus in the electric-power conversion apparatus according to Embodiment 1.

Next, the configuration of the control apparatus 9 will further be explained with reference to FIG. 2. FIG. 2 is a block diagram representing the configuration of the control apparatus in the electric-power conversion apparatus according to Embodiment 1. In FIG. 2, the control apparatus 9 has an output suppression unit 91, a rotation speed calculation unit 92, a torque/current command conversion unit 93, a 3 phase/2 phase conversion unit 94, a voltage command generation unit 95, a 2 phase/3 phase conversion unit 96, a duty conversion unit 97, and a PWM signal generation unit 98.

In order to prevent the respective temperatures Tj of the semiconductor switching devices 311, 312, 313, 314, 315, and 316 from reaching the operation limit temperature, the output suppression unit 91 calculates a torque command Trq*_ctl and generates an output stopping signal Sig_stop, based on the torque command Trq* and the temperature detection values Tj_sens of the semiconductor switching device temperature sensor 7. The detailed configuration of the output suppression unit 91 will be described later. In addition, in Embodiment 1, a means for suppressing the torque command Trq* suppresses the output electric power of the electric-power conversion apparatus 100; however, the suppression means is not limited to the torque-command suppression means and it may be allowed that any of the respective commands for the rotation speed, the current, the voltage, and the like of the motor 1 is suppressed.

The rotation speed calculation unit 92 integrates the rotation angle θm obtained from the rotation-angle sensor 5 so as to convert it into a rotation speed N of the motor 1. The rotation speed calculation unit 92 outputs the calculated rotation speed N to the torque/current command conversion unit 93.

Based on the rotation speed N of the motor 1, obtained from the rotation speed calculation unit 92, and the torque command Trq*_ctl obtained from the output suppression unit 91, the torque/current command conversion unit 93 calculates a d-axis current command Id* and a q-axis current command Iq*. Specifically, for example, by use a torque/current command conversion table having the rotation speed N of the motor 1 and the torque command Trq*_ctl as the axes, the torque/current command conversion unit 93 converts these values into the d-axis current command id* and the d-axis current command Id*. In addition, it may be allowed that the torque/current command conversion unit 93 calculates the d-axis current command Id* and the q-axis current command Iq*, without utilizing the torque/current command conversion table.

Based on the current detection values of the current detection device 32 and the angle detection value corresponding to the electric angle θe detected by the rotation-angle sensor 5, the 3 phase/2 phase conversion unit 94 calculates a d-axis current detection value Id and a q-axis current detection value Iq. In this situation, the current detection values of the current detection device 32 include the U-phase current detection value corresponding to the U-phase current Iu detected by the U-phase current detection unit 321, the V-phase current detection value corresponding to the V-phase current Iv detected by the V-phase current detection unit 322, the W-phase current detection value corresponding to the W-phase current Iw detected by the W-phase current detection unit 323.

Based on the d-axis current command id* and the d-axis current detection value Id and based on the q-axis current command Iq* and the q-axis current detection value Iq, the voltage command generation unit 95 performs current-feedback calculations so as to calculate a d-axis voltage command Vd* and a q-axis voltage command Vq*. Specifically, for example, the voltage command generation unit 95 calculates the d-axis voltage command Vd* and the q-axis voltage command Vq* in such a way that a current difference ΔId, which the difference between the d-axis current command Id* and the d-axis current detection value Id, and a current difference ΔIq, which the difference between the q-axis current command Iq* and the q-axis current detection value Iq, each converge at zero.

Based on the d-axis voltage command Vd* and the q-axis voltage command Vq* obtained from the voltage command generation unit 95 and the electric angle θe obtained from the rotation-angle sensor 5, the 2 phase/3 phase conversion unit 96 calculates three-phase voltage commands Vu*, Vv*, and Vw*. In addition, it is desirable that each of the three-phase voltage commands Vu*, Vv*, and Vw* is set to become the same as or smaller than the DC power-source voltage to be inputted to the inverter unit 31, i.e., a voltage Vcon of the smoothing capacitor 22.

The duty conversion unit 97 creates respective duty commands Du, Dv, and Dw of the three phases, based on the three-phase voltage commands Vu*, Vv*, and Vw* obtained from the 2 phase/3 phase conversion unit 96. The duty conversion unit 97 creates and outputs the duty commands Du, Dv, and Dw corresponding to respective optimum correction control commands.

Based on the output stopping signal Sig_stop obtained from the output suppression unit 91 and the duty commands Du, Dv, and Dw of the respective phases, obtained from the duty conversion unit 97, the PWM signal generation unit 98 creates PWM signals for performing on/off-switching control of the semiconductor switching devices 311, 312, 313, 314, 315, and 316.

Specifically, for example, in the case where the state of the output stopping signal Sig_stop indicates output permission, the PWM signal generation unit 98 compares the duty commands Du, Dv, and Dw of the respective phases with a carrier wave so as to create the PWM signals. In the case where the state of the output stopping signal Sig_stop indicates output prohibition, the PWM signal generation unit 98 creates the PWM signals in such a way that all of the semiconductor switching devices 311, 312, 313, 314, 315, and 316 are tuned off. The PWM signal generation unit 98 creates the PWM signals by adopting, for example, a triangular-wave comparison method in which the carrier is a triangular wave having the shape of an isosceles triangle whose rising speed and falling speed are equal to each other, a saw-tooth-wave comparison method, or the like.

In addition, in FIG. 2, as the PWM signals created by the PWM signal generation unit 98, there are represented a PWM signal UH_SW to be provided to the U-phase upper arm semiconductor switching device 311, a PWM signal VH_SW to be provided to the V-phase upper arm semiconductor switching device 312, a PWM signal WH_SW to be provided to the W-phase upper arm semiconductor switching device 313, a PWM signal UL_SW to be provided to the U-phase lower arm semiconductor switching device 314, a PWM signal VL_SW to be provided to the V-phase lower arm semiconductor switching device 315, and a PWM signal WL_SW to be provided to the W-phase lower arm semiconductor switching device 316.

Figure 3:
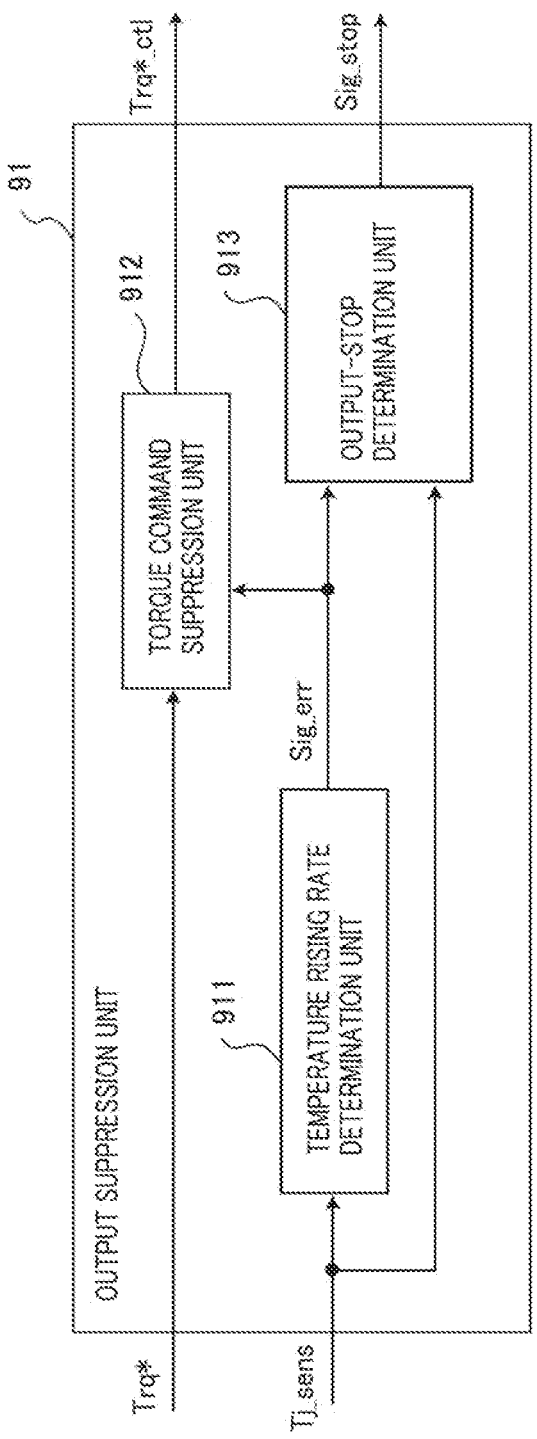
FIG. 3 is a block diagram representing the configuration of an output suppression unit in the electric-power conversion apparatus according to Embodiment 1.

Next, the details of the output suppression unit 91 will be explained with reference to FIG. 3. FIG. 3 is a block diagram representing the configuration of the output suppression unit in the electric-power conversion apparatus according to Embodiment 1. In FIG. 3, the output suppression unit 91 includes a temperature rising rate determination unit 911 as a temperature rising rate determiner, a torque command suppression unit 912, and an output-stop determination unit 913.

From the temperature detection values Tj_sens of the semiconductor switching device temperature sensors 7, the temperature rising rate determination unit 911 detects abnormal heat generation in any of the semiconductor switching devices 311, 312, 313, 314, 315, and 316, an abnormal state of the cooling device 4, or the like, and then outputs the determination result to the torque command suppression unit 912 and the output-stop determination unit 913.

Specifically, the temperature rising rate determination unit 911 compares a predetermined first threshold value Th1 with a temperature rising rate Tj_sens_rat, which is a rising amount, per unit time, of the temperature detection value Tj_sens of the semiconductor switching device temperature sensor 7. In the case where the comparison result indicates that the temperature rising rate, which is the rising amount, per unit time, of the temperature detection value Tj_sens, has exceeded the first threshold value Th1, the temperature rising rate determination unit 911 determines that there exists abnormal heat generation in any of the semiconductor switching devices 311, 312, 313, 314, 315, and 316, an abnormal state of the cooling device 4, or the like; then, the temperature rising rate determination unit 911 creates an error signal Sig_err indicating an abnormal state and then inputs it to the torque command suppression unit 912 and the output-stop determination unit 913. In addition, in the following explanation, the rising amount, per unit time, of the temperature detection value Tj_sens may be referred to simply as a temperature rising rate.

The unit time in which the temperature rising rate Tj_sens_rat of the temperature detection value Tj_sens is measured is set to a time that is substantially shorter enough than the time constant of the semiconductor switching device temperature sensor 7 and is insusceptible to switching noise from any of the semiconductor switching devices 311, 312, 313, 314, 315, and 316.

Moreover, the first threshold value Th1 is set to a value that is not reached by the temperature rising rate Tj_sens_rat of the temperature detection value Tj_sens when the output of the inverter unit 31 as a three-phase inverter is normal and the cooling device 4 is normal. Furthermore, the first threshold value Th1 is set to a value that is not reached by the temperature rising rate Tj_sens_rat of the temperature detection value Tj_sens even when the rising amount, per unit time, of temperature detection value Tj_sens varies toward a higher-value side, in consideration of at least variation in losses in the semiconductor switching devices 311, 312, 313, 314, 315, and 316, variation in the performances of the cooling devices 4, variation in detection values of the semiconductor switching device temperature sensors 7, and the like. When the rising amount, per unit time, of the temperature detection value Tj_sens exceeds the predetermined first threshold value Th1 even once, the error signal Sig_err continues to be in an error state.

The torque command suppression unit 912 creates a torque command Trq*_ctl converted based on the torque command Trq* and the state of the error signal Sig_err. Specifically, for example, when the error signal Sig_err indicates an error state, the torque command suppression unit 912 multiplies the torque command Trq* by a predetermined rate so as to create and then output the torque command Trq*_ctl having a value lower than that of the torque command Trq*.

In contrast, when the error signal Sig_err indicates a normal state, the torque command suppression unit 912 directly outputs the torque command Trq*, as the torque command Trq*_ctl. In addition, as described above, when the error signal Sig_err indicates an error state, the torque command Trq*_ctl is created by multiplying the torque command Trq* by a predetermined rate; however, the creation method is not limited thereto and it may be allowed that the torque command Trq*_ctl is created, for example, by calculating the rate in real time from the temperature detection value Tj_sens of the semiconductor switching device temperature sensors 7.

The output-stop determination unit 913 outputs the output stopping signal Sig_stop prohibiting the inverter unit 31 from outputting, based on the state of the error signal Sig_err and the temperature detection value Tj_sens of the semiconductor switching device temperature sensor 7. Specifically, for example, when the error signal Sig_err of an error state continues for a predetermined time, the output-stop determination unit 913 outputs the output stopping signal Sig_stop, as a signal indicating prohibition of the driving.

That is to say, the output suppression unit 91, i.e., the control apparatus 9 has the output-stop determination unit 913 that compares a predetermined third threshold value Th3 with the temperature detection value Tj_sens and performs protective operation for suppressing the output of the electric-power conversion unit 3, and then stops the output of the electric-power conversion unit 3 when the temperature detection value Tj_sens exceeds the third threshold value Th3.

The predetermined time signifies a time in which in the case of a vehicle such as an electric automobile or a hybrid automobile whose driving source is a motor, even when there exists abnormal heat generation in any of the semiconductor switching devices 311, 312, 313, 314, 315, and 316 or an abnormal state of the cooling device 4, the vehicle can travel by itself and stop in a place causing no trouble. Concurrently, in the case where the error signal Sig_err indicates an error state, the output-stop determination unit 913 compares the predetermined first threshold value Th1 with the temperature detection value Tj_sens of the semiconductor switching device temperature sensor 7; in the case where the temperature detection value Tj_sens exceeds the first threshold value Th1, the output-stop determination unit 913 outputs the output stopping signal Sig_stop indicating prohibition of the driving so that the respective temperatures Tj of the semiconductor switching devices 311, 312, 313, 314, 315, and 316 are prevented from reaching the breakage temperature, which is the operation limit temperature.

In other words, when at least one of the case where the error signal Sig_err indicating an error state continues for a predetermined time and the case where the temperature detection value Tj_sens of the semiconductor switching device temperature sensor 7 exceeds the predetermined first threshold value Th1 is established, the output-stop determination unit 913 outputs the output stopping signal Sig_stop indicating prohibition of the driving.

Figure 4:
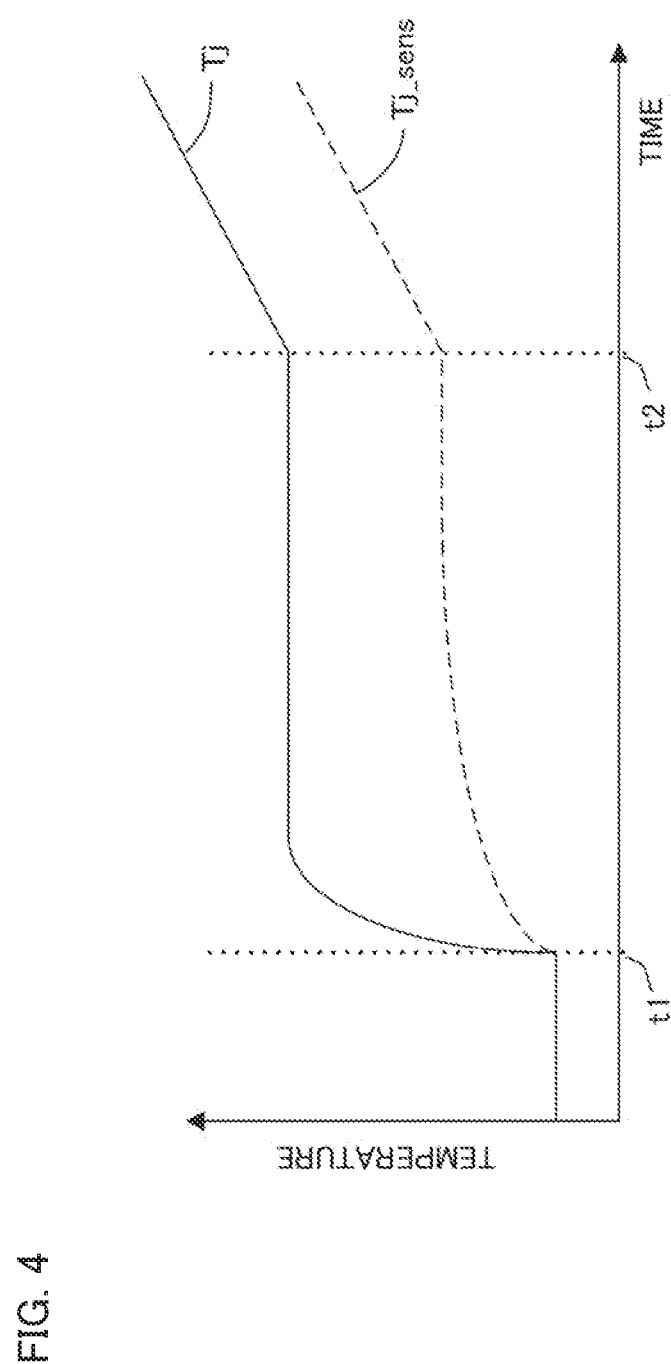
FIG. 4 is an explanatory graph representing the respective transitions of the temperature of a semiconductor switching device and a temperature detection value in the electric-power conversion apparatus according to Embodiment 1.

FIG. 4 is an explanatory graph representing the respective transitions of the temperature of a semiconductor switching device and a temperature detection value in the electric-power conversion apparatus according to Embodiment 1; the ordinate denotes the temperature, and the abscissa denotes the time. More specifically, FIG. 4 represents the respective temperature transitions of the temperature Tj of the semiconductor switching device 311 and the temperature detection value Tj_sens of the semiconductor switching device temperature sensor 7 at a time when the cooling medium of the cooling device 4 is lost after the output of the inverter unit 31 has been changed from "0" to a specific value and then a sufficient time has elapsed with that state.

In addition, although the subject of each of the temperature Tj of the semiconductor switching device and the temperature detection value Tj_sens represented in FIG. 4 is the semiconductor switching device 311, the subject is not limited to the semiconductor switching device 311; even when any of the semiconductor switching devices 312, 313, 314, 315, and 316 is the subject, the same temperature transitions are represented.

FIG. 4 represents the fact that at a time point t1, the output of the electric-power conversion unit 3 changes from "0" to a specific value and then the cooling medium of the cooling device 4 is lost at a time point t2 after a sufficient time has elapsed with that state. As represented in FIG. 4, before the time point t2 at which the cooling medium of the cooling device 4 is lost, the temperature Tj of the semiconductor switching device and the temperature detection value Tj_sens of the semiconductor switching device temperature sensor 7 settle at a substantially constant temperature after a sufficient time, determined based on the loss in the semiconductor switching device 311 and the performance of the cooling device 4, elapses. Because being obtained by indirectly measuring the temperature Tj of the semiconductor switching device 311, the temperature detection value Tj_sens of the semiconductor switching device temperature sensor 7 has a time constant longer than that of the temperature Tj of the semiconductor switching device 311, and the settling temperature thereof becomes lower than the temperature Tj of the semiconductor switching device 311.

When at the time point t2, the cooling medium of the cooling device 4 is lost, the temperature of the cooling device 4 steeply rises due to heat generation in the semiconductor switching device 311; then, as is the case with the temperature rise of the cooling device 4, the temperature Tj of the semiconductor switching device 311 and the temperature detection value Tj_sens of the semiconductor switching device temperature sensor 7 rise.

Figure 5:
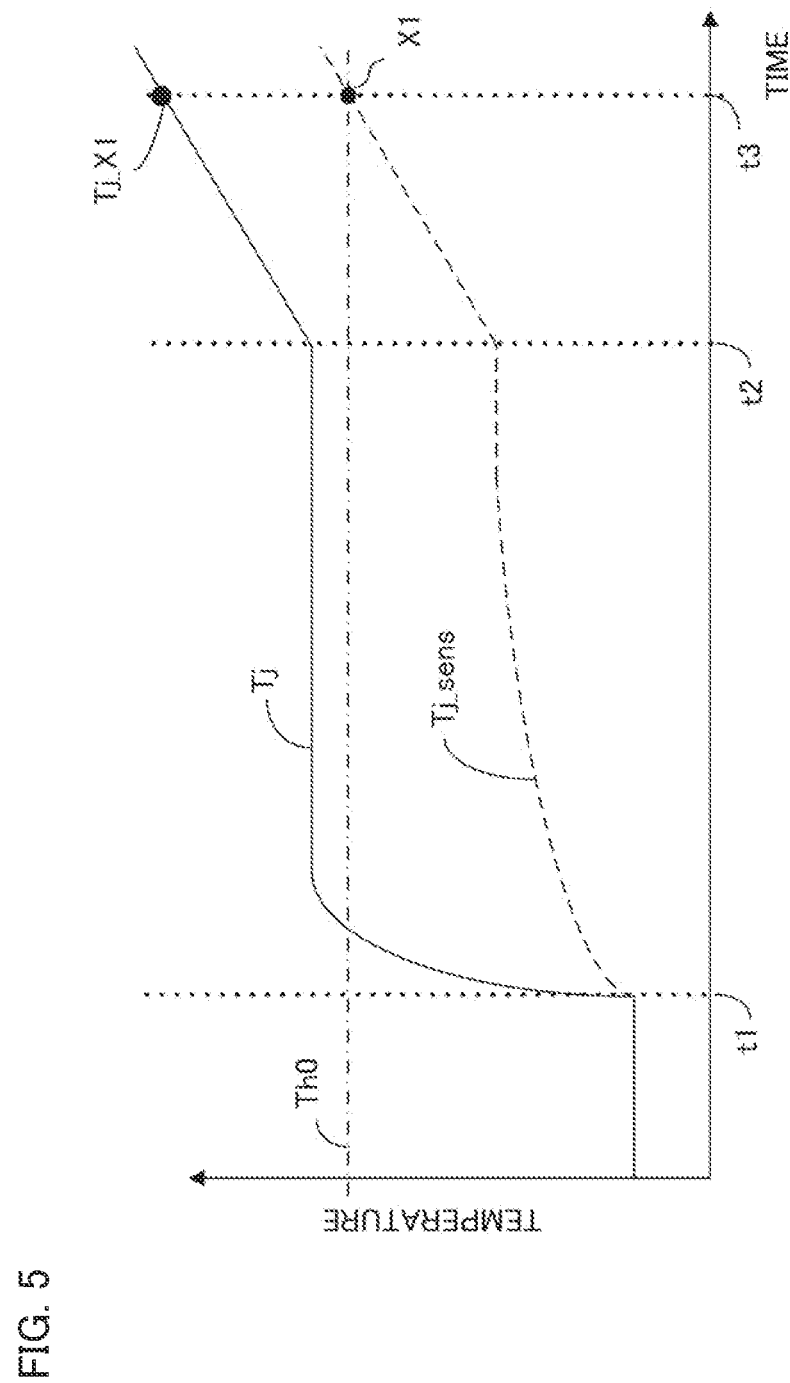
FIG. 5 is an explanatory graph representing the respective transitions, until detection of an abnormality, of the temperature of a semiconductor switching device and a temperature detection value at a time when a conventional technology is utilized.

FIG. 5 is an explanatory graph representing the respective transitions, until detection of an abnormality, of the temperature of a semiconductor switching device and a temperature detection value at a time when a conventional technology is utilized; the ordinate denotes the temperature, and the abscissa denotes the time. In FIG. 5, a threshold value Th0 to be compared with the temperature detection value Tj_sens for detecting an abnormality and a timing t3 of abnormality detection X1 are added to FIG. 4.

In FIG. 5, as described above, in consideration of a detection error in the temperature sensor 7, variations in the amounts of generated heat in the semiconductor switching devices, variations in the heat-generation amounts in the semiconductor switching devices 311, 312, 313, 314, 315, and 316, variations in the inflow amounts of the cooling medium, and the like, the threshold value Th0 is set higher so that no abnormality is erroneously detected when the driving condition for the electric-power conversion unit 3 and the arrangement environment for the semiconductor switching devices 311, 312, 313, 314, 315, and 316 are normal.

Accordingly, for example, when under the condition that as represented in FIG. 5, there exists no variation, the cooling medium of the cooling device 4 is lost at the time point t2, the time [t3−t2] from the time point t2 to the time of the abnormality detection X1 at which the temperature detection value Tj_sens reaches the threshold value Th0 is prolonged. That is to say, in the case where the conventional technology is utilized, the time from the time point t2 to the time of the abnormality detection X1 is prolonged; therefore, the temperature of the semiconductor switching device 311 becomes Tj_X1, i.e., a higher temperature.

Figures 6A, 6B:
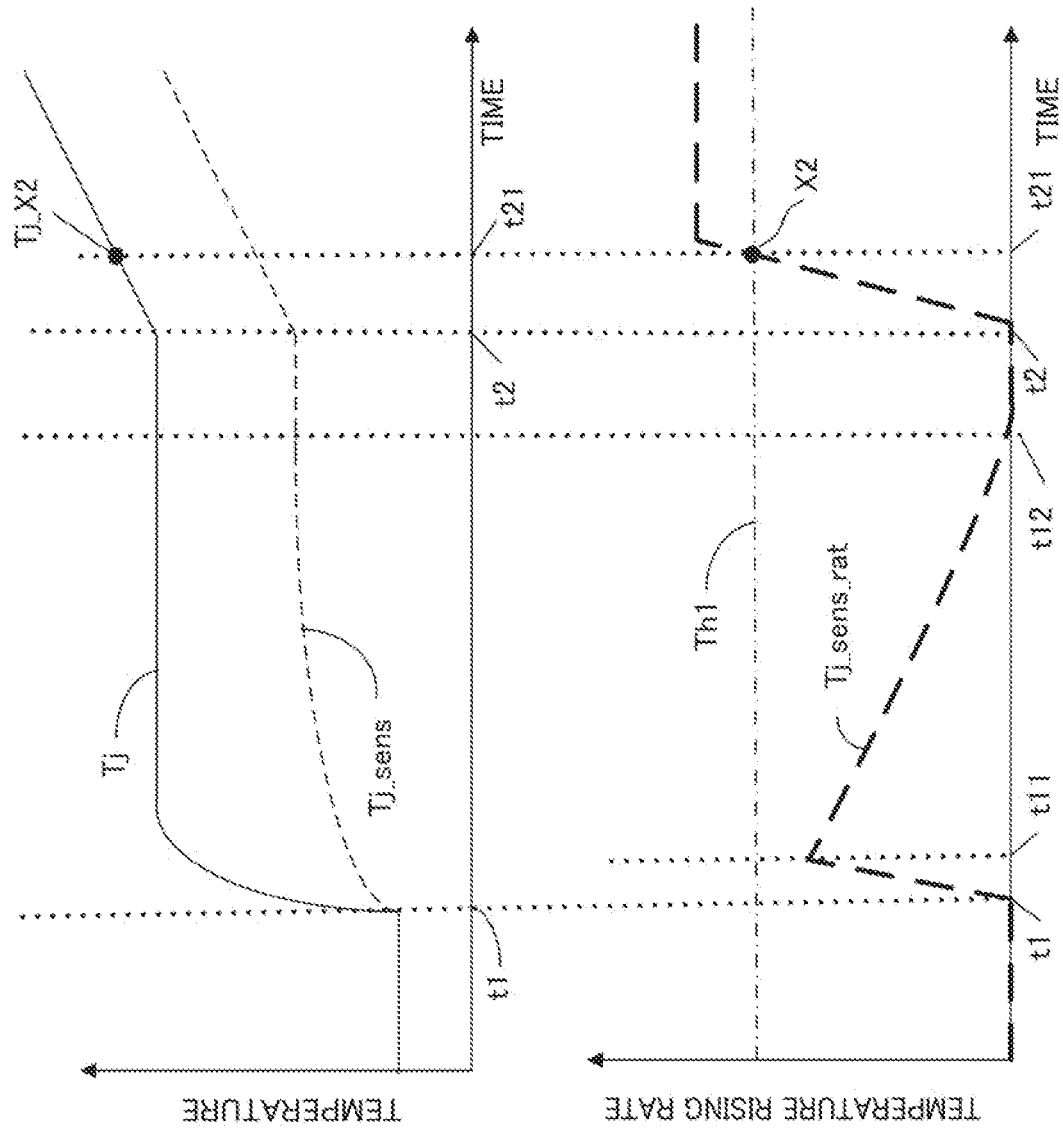
FIG. 6A is an explanatory graph representing the respective transitions, until detection of an abnormality, of the temperature of a semiconductor switching device and a temperature detection value in the electric-power conversion apparatus according to Embodiment 1.
FIG. 6B is an explanatory graph representing the transition, until detection of an abnormality, of the temperature rising rate of a temperature detection value in the electric-power conversion apparatus according to Embodiment 1.

FIG. 6A is an explanatory graph representing the respective transitions, until detection of an abnormality, of the temperature of a semiconductor switching device and a temperature detection value in the electric-power conversion apparatus according to Embodiment 1; the ordinate denotes the temperature, and the abscissa denotes the time. FIG. 6B is an explanatory graph representing the transition, until detection of an abnormality, of the temperature rising rate of a temperature detection value in the electric-power conversion apparatus according to Embodiment 1; the ordinate denotes the temperature rising rate, and the abscissa denotes the time. In FIGS. 6A and 6B, the temperature rising rate Tj_sens_rat of the temperature detection value Tj_sens at a time before the time point t2 at which the cooling medium of the cooling device 4 is lost steeply rises, as the output of the inverter unit 31 rises from "0", and then reaches the maximum value in the normal state at a time point t11 immediately after the time point t1.

After that, the temperature rising rate Tj_sens_rat gradually decreases; because at a time point t12 until which a sufficient time has elapsed from the time point t11, the temperature detection value Tj_sens settles, the temperature rising rate Tj_sens_rat becomes "0".

Then, when at the time point t2, the cooling medium of the cooling device 4 is lost, the temperature rising rate Tj_sens_rat of the temperature detection value Tj_sens reaches a value that is not reached at a time when the driving condition for the electric-power conversion unit 3 and the arrangement environment are normal; at a time point 21, the temperature rising rate Tj_sens_rat reaches the first threshold value Th1, and abnormality detection X2 is immediately made. In this situation, in consideration of a detection error in the temperature sensor 7, variations in the amounts of generated heat in the semiconductor switching devices, variations in the heat-generation amounts in the semiconductor switching devices 311, 312, 313, 314, 315, and 316, variations in the inflow amounts of the cooling medium, and the like, the first threshold value Th1 is set higher so that no abnormality is erroneously detected when the driving condition for the electric-power conversion unit 3 and the arrangement environment for the semiconductor switching devices 311, 312, 313, 314, 315, and 316 are normal.

In other words, because the time until the abnormality detection X2 is short, the temperature of the semiconductor switching device 311 becomes Tj_X2, which is lower than the temperature Tj_X1 at a time when the conventional technology in FIG. 5 is utilized. In addition, in order to avoid the effect of noise, the temperature rising rate Tj_sens_rat is represented as a ramp function with a long unit time; however, the temperature rising rate Tj_sens_rat is not limited thereto and it may be allowed the unit time is shorter. In that case, the time from the time point t2 of abnormality occurrence to the time point t21 of the abnormality detection X2 can be shortened; thus, the temperature rise of the semiconductor switching device 311 can more effectively be suppressed.

Figure 7A:
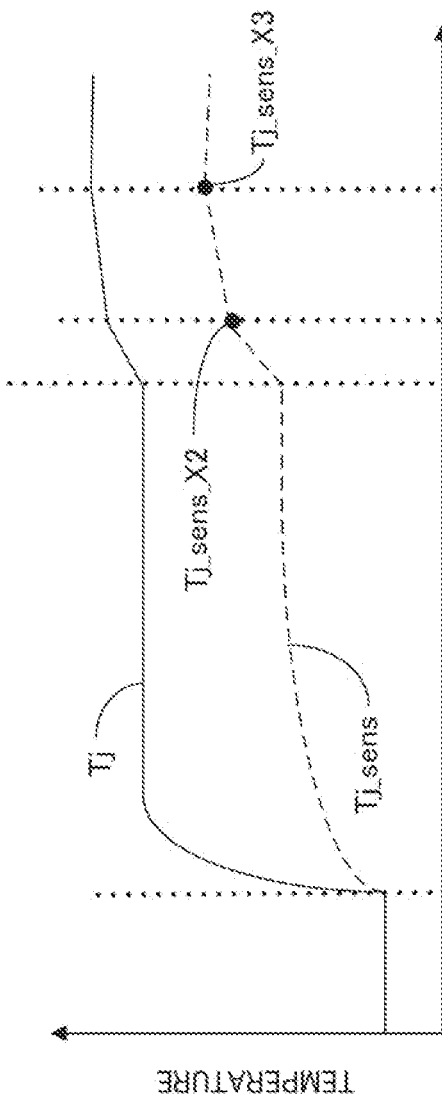
FIG. 7A is an explanatory graph representing the respective transitions, until protective operation, of the temperature of a semiconductor switching device and a temperature detection value in the electric-power conversion apparatus according to Embodiment 1.
Figure 7B:
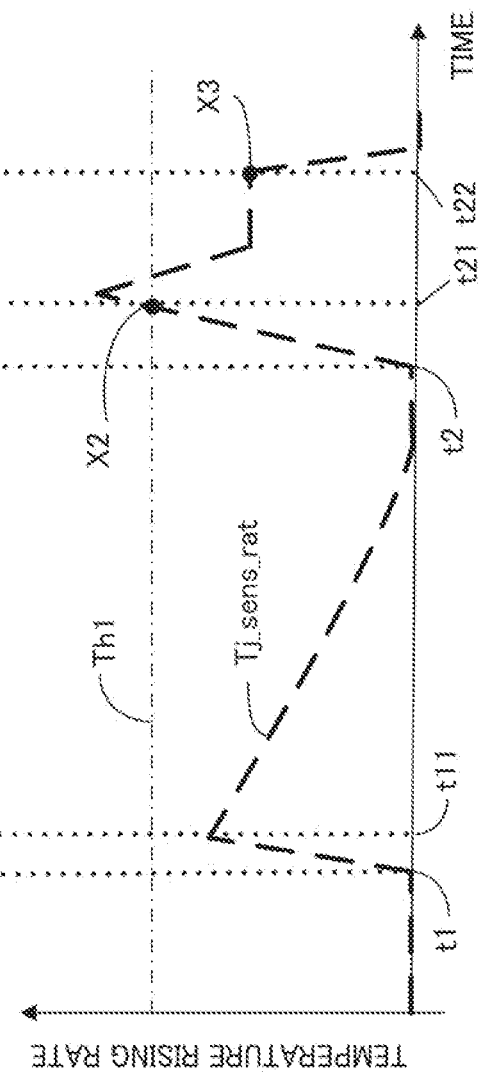
FIG. 7B is an explanatory graph representing the transition, until protective operation, of the temperature rising rate of a temperature detection value in the electric-power conversion apparatus according to Embodiment 1.

FIG. 7A is an explanatory graph representing the respective transitions, until protective operation, of the temperature of a semiconductor switching device and a temperature detection value in the electric-power conversion apparatus according to Embodiment 1; the ordinate denotes the temperature, and the abscissa denotes the time. FIG. 7B is an explanatory graph representing the transition, until protective operation, of the temperature rising rate of a temperature detection value in the electric-power conversion apparatus according to Embodiment 1; the ordinate denotes the temperature rising rate, and the abscissa denotes the time. In FIGS. 7A and 7B, after the abnormality detection X2 at the time point t21, the error signal Sig_err of the temperature rising rate determination unit 911, represented in FIG. 3, indicates an error state; the torque command suppression unit 912 multiplies the torque command Trq* by a predetermined rate; then, the torque command Trq*_ctl, which is lower than the torque command Trq*, is outputted from the torque command suppression unit 912.

Because the torque command Trq*_ctl is a value lower than the torque command Trq*, the output of the inverter unit 31 decreases and hence the temperature rising rate Tj_sens_rat of the temperature detection value Tj_sens obtained by the semiconductor switching device temperature sensor 7 decreases. Although at this moment, the temperature rising rate Tj_sens_rat is lower than the first threshold value Th1, the error signal Sig_err continuously indicates the error state. At a time point t22 after a predetermined time [t22−t21] has elapsed from the abnormality detection X2, the output stopping signal Sig_stop outputted from the output-stop determination unit 913 represented in FIG. 3 indicates prohibition of the driving; thus, the output of the inverter unit 31 becomes "0". Accordingly, a temperature Tj_sens_X2 of the semiconductor switching device at the time point t22 represented in FIG. 7A does not reach the operation limit temperature of the semiconductor switching device 311.

As described above, in the electric-power conversion apparatus 100 according to Embodiment 1, from respective temperature detection values of the semiconductor switching device temperature sensor 7 for detecting the temperatures of the peripheral portions of the semiconductor switching devices 311, 312, 313, 314, 315, and 316, the temperature rising rates thereof are monitored, so that it is made possible to detect in a shorter time that the inflow of the cooling medium flowing in the cooling device 4 has stopped or has been lost, and hence it is made possible to lower the maximum reaching temperature of the semiconductor switching device; therefore, optimum control in which the driving condition for the electric-power conversion apparatus 100 is contrived makes it possible that while the semiconductor switching devices 311, 312, 313, 314, 315, and 316 are prevented from being broken by a high temperature, the electric-power conversion apparatus 100 is continuingly driven.

In addition, each of the semiconductor switching devices 311, 312, 313, 314, 315, and 316 in the inverter unit 31 may be formed by use of any semiconductor device; however, it can be formed, for example, by use of a wide bandgap semiconductor. The materials of wide bandgap semiconductors include SiC, GaN, and the like.

For example, in comparison with a conventional inverter unit having semiconductor switching devices that are each formed by use of Si, the inverter unit 31 having the semiconductor switching devices 311, 312, 313, 314, 315, and 316 that are each formed by use of a wide bandgap semiconductor is characterized by having a high temperature resistance, by being low-loss, and by being capable of being driven in a high-frequency manner. Accordingly, by forming each of the semiconductor switching devices 311, 312, 313, 314, 315, and 316 by use of a wide bandgap semiconductor, it is made possible to realize an electric-power conversion apparatus that is not liable to be broken because it is low-loss, it suppresses heat generation more, and it has a high temperature resistance.

Although it may be allowed that as described above, a single arm in the inverter unit 31 is formed of a single semiconductor switching device, it may be allowed that in order to reduce a current that flows in a single semiconductor switching device, a single arm is formed of two or more semiconductor switching devices connected in parallel with one another. In this case, when a single temperature sensor is mounted for each of the semiconductor switching devices, the number of the temperature sensors becomes a massive one; thus, the cost hikes and the temperature obtaining circuit becomes large-scale. For avoiding the foregoing problems, it is only necessary that a single temperature sensor is provided for a single arm so as to comprehensively obtain the respective temperatures of the all semiconductor switching devices. In Embodiment 1, in consideration of the variations in the heat-generation amounts in the semiconductor switching devices, the first threshold value Th1 is set to a higher value; thus, the arrangement of the temperature sensors in the places where an average temperature can be obtained makes it possible that even when any one of the semiconductor switching devices generates excessive heat, the variation in the obtained temperatures is decreased and hence a higher effect can be obtained.

Embodiment 2

Next, an electric-power conversion apparatus according to Embodiment 2 will be explained. In Embodiment 2, in contrast to the configuration of the electric-power conversion apparatus according to Embodiment 1, the first threshold value Th1 in the temperature rising rate determination unit 911 is dynamically changed. In Embodiment 2, the explanations for the constituent elements that are the same as or equivalent to those in Embodiment 1 will be omitted, and the points different from those in Embodiment 1 will mainly be explained.

In Embodiment 1, the temperature rising rate Tj_sens_rat is compared with the predetermined first threshold value Th1 so that an abnormal state is determined; however, for example, in the case where the output of the inverter unit 31 is low, there exists a probability that even when the cooling medium of the cooling device 4 is lost, the temperature rising rate Tj_sens_rat does not reach the first threshold value Th1. Therefore, in Embodiment 2, these problems will be solved through a higher-level determination.

In the case where the inverter unit 31 operates with the rated output, the first threshold value Th1 is preliminarily set so that the temperature rising rate Tj_sens_rat of the temperature detection value Tj_sens does not exceed the first threshold value Th1; however, in Embodiment 2, the first threshold value Th1 is dynamically changed in accordance with the output state of the inverter unit 31. Specifically, as the output of the inverter unit 31 is larger, the first threshold value Th1 is set to a higher level; as the output of the inverter unit 31 is smaller, the first threshold value Th1 is set to a lower level. As a result, there is solved the problem that in the case where the output of the inverter unit 31 is low, the temperature rising rate Tj_sens_rat does not reach the first threshold value Th1 even when the cooling device 4 is abnormal.

In this situation, because when the output of the inverter unit 31 is low, the respective currents flowing in the semiconductor switching devices 311, 312, 313, 314, 315, and 316 are small, the width from an initial temperature to a reached temperature (hereinafter, referred to as a temperature rising amount) becomes small. Meanwhile, due to the performance of the cooling device 4 and the structure of each of the semiconductor switching devices 311, 312, 313, 314, 315, and 316, the thermal time constant at a time when specific heat is generated does not change. Accordingly, because the temperature rising amount becomes smaller, the temperature rising rate Tj_sens_rat becomes smaller in a corresponding manner.

In other words, it is desirable that the first threshold value Th1 to be compared with the temperature rising rate Tj_sens_rat is set in such a way as to be proportional to an electric-power loss in each of the semiconductor switching devices 311, 312, 313, 314, 315, and 316. Specifically, the first threshold value Th1 is set in such a way as to be a maximum value when the inverter unit 31 operates with the rated output, i.e., the loss is maximal, and to decrease as the loss falls.

The output state of the inverter unit 31 is calculated in real time, by use of the measurement result of the current detection device 32, the rotation speed and the actual torque of the motor 1, the torque command or the current command of the command generation device 8, and the like. In addition, in order to reduce the processing load on the control IC and the CPU, it may be allowed that the correlation between the output of the inverter unit 31 and the electric-power losses in the semiconductor switching devices 311, 312, 313, 314, 315, and 316 is preliminarily stored, as a map, in the control IC, the CPU, or the like and then the output state of the inverter unit 31 is calculated.

In contrast to the configuration of Embodiment 1, in the foregoing electric-power conversion apparatus according to Embodiment 2, the first threshold value Th1 utilized in the temperature rising rate determination unit 911 is made to dynamically change in accordance with the output of the inverter unit 31; thus, even when the output of the inverter unit 31 is low, an abnormality in the cooling device 4 can be detected.

Embodiment 3

Figure 8:
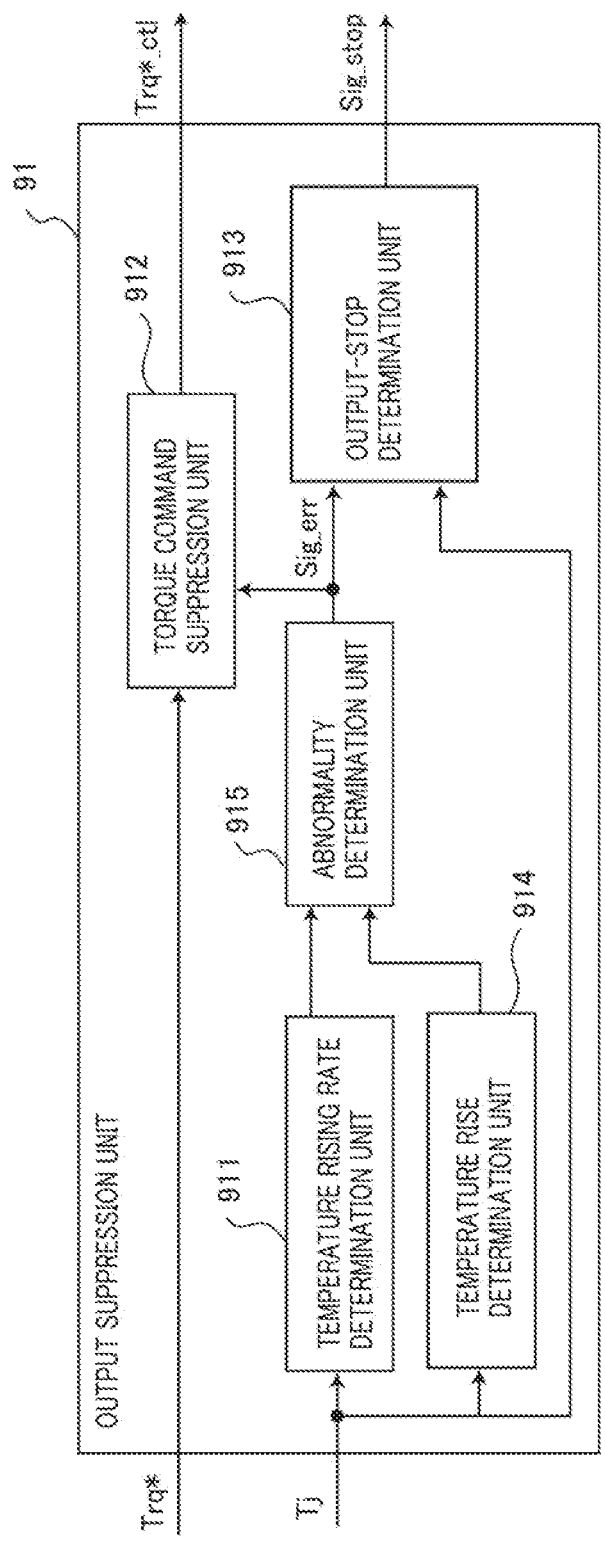
FIG. 8 is a block diagram representing the configuration of an output suppression unit in an electric-power conversion apparatus according to Embodiment 3.

FIG. 8 is a block diagram representing the configuration of an output suppression unit in an electric-power conversion apparatus according to Embodiment 3. In the electric-power conversion apparatus according to Embodiment 3, a change of the output destination of the temperature rising rate determination unit 911 and addition of a temperature rise determination unit 914 and an abnormality determination unit 915 to the output suppression unit 91 are applied to the configuration of the electric-power conversion apparatus according to Embodiment 1. In Embodiment 3, the explanations for the constituent elements that are the same as those in Embodiment 1 will be omitted, and the points different from those in Embodiment 1 will mainly be explained.

In FIG. 8, the output of the temperature rising rate determination unit 911 is inputted to the abnormality determination unit 915. The temperature rise determination unit 914 is a function provided in such a way as to be parallel to the function of the temperature rising rate determination unit 911; specifically, for example, the temperature detection value Tj_sens is compared with a second threshold value Th2 (unrepresented) so that an abnormal heat generation in any one of the semiconductor switching devices 311, 312, 313, 314, 315, and 316, an abnormal state of the cooling device 4, and the like are detected; then, the result is inputted to the abnormality determination unit 915.

The second threshold value Th2 is set to a higher value so that for example, in the case where even when the cooling medium of the cooling device 4 is lost, the temperature rising rate determination unit 911 cannot detect the abnormality, i.e., only when the output of the inverter unit 31 is low, the temperature rise determination unit 914 operates. Even in the case where after the abnormal state is detected, the temperature detection value Tj_sens falls to be smaller than the second threshold value Th2, the temperature rise determination unit 914 continues the determination on an abnormal state.

The abnormality determination unit 915 monitors the respective output results of the temperature rising rate determination unit 911 and the temperature rise determination unit 914; when at least one of the temperature rising rate determination unit 911 and the temperature rise determination unit 914 determines that an abnormality exists, the abnormality determination unit 915 outputs the error signal Sig_err indicating an abnormal state.

Here, the conventional technology and Embodiment 3 will be compared with each other. The conventional technology and Embodiment 3 has the same function in which the temperature detection value Tj_sens is compared with a predetermined threshold value and then at a time point when the temperature detection value Tj_sens exceeds the threshold value, protective operation is started. However, Embodiment 3 is different from the conventional technology in the following point: in the conventional technology, one and the same threshold value is provided for all the output regions of the inverter unit 31; however, in the Embodiment 3, the temperature rising rate determination unit 911 detects an abnormality in the high output region of the inverter unit 31, based on the first threshold value Th1, and the temperature rise determination unit 914 detects an abnormality in the low output region, based on the second threshold value Th2.

As described above, it is a problem that the respective maximum reaching temperatures of the semiconductor switching devices 311, 312, 313, 314, 315, and 316 become high; in the method in which as each of the conventional technology and Embodiment 3, the temperature detection value Tj_sens and the predetermined second threshold value Th2 are compared with each other, the maximum reaching temperature of each of the semiconductor switching devices 311, 312, 313, 314, 315, and 316 becomes the sum of the second threshold value Th2 and the difference between the temperature Tj and the temperature detection value Tj_sens of each of the semiconductor switching devices 311, 312, 313, 314, 315, and 316.

Because it is a temperature that is not reached when the electric-power conversion apparatus 100 operates normally, the second threshold value Th2 cannot be lowered. Meanwhile, in the case where when the output of the inverter unit 31 is low, the temperature Tj of the semiconductor switching device at a time of high output and the second threshold value Th2 are compared with each other, the difference between the temperature Tj of the semiconductor switching device and the temperature detection value Tj_sens decreases. Therefore, when the second threshold value Th2 that works only when the output of the inverter unit 31 is low is provided, the difference between the temperature Tj of the semiconductor switching device and the temperature detection value Tj_sens becomes small, in comparison with the conventional technology; thus, the maximum reaching temperature of the semiconductor switching device can be lowered.

The control apparatus 9 in the electric-power conversion apparatus according to Embodiment 3 has the foregoing temperature rising rate determination unit 911 and the temperature rise determination unit 914 that compares the predetermined second threshold value Th2 with the temperature detection value Tj_sens of the semiconductor switching device temperature sensor 7 and then determines that the temperature detection value Tj_sens has exceeded the second threshold value Th2; when at least one of the temperature rising rate determination unit 911 and the temperature rise determination unit 914 determines that the foregoing corresponding threshold value has been exceeded, the control apparatus 9 performs protective operation for suppressing the output of the electric-power conversion unit 3.

The second threshold value Th2 is set to a value the same as or larger than the temperature detection value Tj_sens that is reached when the electric-power conversion unit 3 is abnormal or outputs excessive output.

Moreover, the first threshold value Th1 is set to a value with which the electric-power conversion unit 3 can operate for a predetermined time after the temperature detection value Tj_sens of the semiconductor switching device temperature sensor 7 has exceeded the second threshold value Th2.

Still moreover, after at least one of the temperature rising rate determination unit 911 and the temperature rise determination unit 914 has determined that an abnormality exists, the control apparatus 9 performs protective operation for suppressing the output of the electric-power conversion unit 3.

Moreover, even when after performing the protective operation for suppressing the output of the electric-power conversion unit 3, there occurs at least one of the state where the temperature rising rate Tj_sens_rat becomes lower than the first threshold value Th1 and the state where the temperature detection value Tj_sens becomes lower than the second threshold value Th2, the control apparatus 9 continues the protective operation for suppressing the output of the electric-power conversion unit 3.

Furthermore, the output of the electric-power conversion unit 3 is stopped after a predetermined time from the time when the protective operation for suppressing the output of the electric-power conversion unit 3 has been performed.

The control apparatus 9 may have the output-stop determination unit 913 that compares the predetermined third threshold value Th3 with the temperature detection value Tj_sens, after performing protective operation for suppressing the output of the electric-power conversion unit 3, and then stops the output of the electric-power conversion unit 3 when the temperature detection value Tj_sens exceeds the third threshold value Th3.

Furthermore, each of the semiconductor switching devices 311, 312, 313, 314, 315, and 316 forms one of the arms in the electric-power conversion unit 3 and is connected in parallel with two or more semiconductor switching devices; it may be allowed that the semiconductor switching device temperature sensor 7 detects the average value of respective temperatures of all the semiconductor switching devices.

The foregoing electric-power conversion apparatus according to Embodiment 3 makes it possible that when the output of the inverter unit is high, an abnormality in the cooling device is determined based on a temperature rising rate and that when the output of the inverter unit is low, an abnormality in the cooling device is determined based on a temperature detection value.

Although the present disclosure is described above in terms of various exemplary embodiments, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present application. For example, there are included the case where at least one constituent element is modified, added, or omitted and the case where at least one constituent element is extracted and then combined with constituent elements of other embodiments.

What is claimed is:

1. An electric-power conversion apparatus comprising:
   an electric-power converter including semiconductor switching devices;
   a cooling device for cooling the semiconductor switching devices; and
   a control apparatus for controlling switching of the semiconductor switching devices, further including
   a temperature sensor that detects a temperature of the semiconductor switching device, and
   a temperature rising rate determiner that compares a predetermined first threshold value with a temperature rising rate calculated based on a temperature detection value detected by the temperature sensor, wherein when the temperature rising rate determiner determines that the temperature rising rate has exceeded the first threshold value, protective operation for suppressing an output of the electric-power converter is performed.

2. The electric-power conversion apparatus according to claim 1, wherein the first threshold value is set to a value the same as or larger than a value that is reached by the temperature rising rate when there is established at least one of a case where the electric-power converter or the cooling device is abnormal and a case where the electric-power converter performs excessive outputting.

3. The electric-power conversion apparatus according to claim 2, wherein the first threshold value is set in such a way that the electric-power converter can operate for a predetermined time or longer after the temperature rising rate exceeds the first threshold value.

4. The electric-power conversion apparatus according to claim 2, wherein the first threshold value is changed based on an output state of the electric-power converter.

5. The electric-power conversion apparatus according to claim 3, wherein the first threshold value is changed based on an output state of the electric-power converter.

6. The electric-power conversion apparatus according to claim 1, wherein the first threshold value is set in such a way that the electric-power converter can operate for a predetermined time or longer after the temperature rising rate exceeds the first threshold value.

7. The electric-power conversion apparatus according to claim 6, wherein the first threshold value is changed based on an output state of the electric-power converter.

8. The electric-power conversion apparatus according to claim 1, wherein the first threshold value is changed based on an output state of the electric-power converter.

9. The electric-power conversion apparatus according to claim 8, wherein when an output of the electric-power converter is relatively low, the first threshold value is set to a relatively low value, and when an output of the electric-power converter is relatively high, the first threshold value is set to a relatively high value.

10. The electric-power conversion apparatus according to claim 8, further including
    a current detection device for measuring a current flowing in the semiconductor switching device, and
    a voltage detection device for measuring a voltage to be applied to the semiconductor switching device, wherein the output state is calculated by use of at least one of a detection value of the current detection device, a detection value of the voltage detection device, and a command value for commanding an output of the electric-power converter.

11. The electric-power conversion apparatus according to claim 1, wherein after the temperature rising rate exceeds the first threshold value, protective operation for suppressing an output of the electric-power converter is performed.

12. The electric-power conversion apparatus according to claim 1, wherein even when after protective operation for suppressing an output of the electric-power converter has been performed and then the temperature rising rate becomes the same as or lower than the first threshold value, the protective operation for suppressing an output of the electric-power converter is continued.

13. The electric-power conversion apparatus according to claim 1,
wherein the control apparatus has a temperature rise determiner that compares a predetermined second threshold value with a temperature detection value of the temperature sensor and determines that the temperature detection value has exceeded the second threshold value, and
wherein when at least one of the temperature rising rate determiner and the temperature rise determiner makes the determination, the control apparatus performs protective operation for suppressing an output of the electric-power converter.

14. The electric-power conversion apparatus according to claim 13, wherein the second threshold value is set to a value the same as or larger than the temperature detection value that is reached when there is established at least one of a case where the electric-power converter is abnormal and a case where the electric-power converter performs excessive outputting.

15. The electric-power conversion apparatus according to claim 13, wherein the first threshold value is set in such a way that the electric-power converter can operate for a predetermined time after the temperature detection value has exceeded the second threshold value.

16. The electric-power conversion apparatus according to claim 13, wherein after at least one of the temperature rising rate determiner and the temperature rise determiner makes the determination, protective operation for suppressing an output of the electric-power converter is performed.

17. The electric-power conversion apparatus according to claim 13, wherein even when after the protective operation for suppressing an output is performed, there occurs at least one of a state where the temperature rising rate becomes lower than the first threshold value and a state where the temperature detection value becomes lower than the second threshold value, the protective operation for suppressing an output of the electric-power converter is continued.

18. The electric-power conversion apparatus according to claim 1, wherein the electric-power converter is stopped from outputting, after the elapse of a predetermined time from a time when protective operation for suppressing an output of the electric-power converter has been performed.

19. The electric-power conversion apparatus according to claim 1, wherein the control apparatus has an output-stop determiner that compares a predetermined third threshold value with the temperature detection value, performs the protective operation for suppressing an output, and then stops the electric-power converter from outputting when the temperature detection value exceeds the third threshold value.

20. The electric-power conversion apparatus according to claim 1,
wherein the semiconductor switching device included in one of arms in the electric-power converter is connected in parallel with two or more semiconductor switching devices, and
wherein the temperature sensor detects an average value of respective temperatures of all the semiconductor switching devices.

* * * * *